United States Patent
Cronie

(10) Patent No.: US 9,744,870 B2
(45) Date of Patent: Aug. 29, 2017

(54) WIRELESSLY CHARGING VEHICLES MOVING IN VEHICLE CONVOY

(71) Applicant: Empire Technology Development LLC, Wilmington, DE (US)

(72) Inventor: Harm Stefan Cronie, Poliez-le-Grand (CH)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 303 days.

(21) Appl. No.: 14/538,615

(22) Filed: Nov. 11, 2014

(65) Prior Publication Data

US 2016/0129793 A1    May 12, 2016

(51) Int. Cl.
*B60L 11/18* (2006.01)

(52) U.S. Cl.
CPC ......... *B60L 11/182* (2013.01); *Y02T 10/7005* (2013.01)

(58) Field of Classification Search
CPC ............................ B60L 11/182; Y02T 10/7005
See application file for complete search history.

(56) References Cited

U.S. PATENT DOCUMENTS

| | | | |
|---|---|---|---|
| 7,068,991 B2 * | 6/2006 | Parise | B01F 5/0614 320/109 |
| 8,013,570 B2 | 9/2011 | Baxter et al. | |
| 8,212,414 B2 * | 7/2012 | Howard | B60L 11/182 307/104 |
| 8,324,859 B2 | 12/2012 | Rossi | |
| 8,473,135 B2 * | 6/2013 | Sekijima | G01C 21/3469 701/22 |
| 8,712,481 B2 * | 4/2014 | Shionoiri | B60L 8/003 455/569.2 |

(Continued)

FOREIGN PATENT DOCUMENTS

JP    2013070514 A  *  4/2013

OTHER PUBLICATIONS

"Volvo—First Demonstration of SARTRE Vehicle Platooning," Youtube, accessed at https://www.youtube.com/watch?v=OcGFPnWYErk, Jan. 18, 2011, pp. 1-2.

(Continued)

*Primary Examiner* — Naum B Levin
(74) *Attorney, Agent, or Firm* — Turk IP Law, LLC

(57) ABSTRACT

Technologies are generally described for a distributed system to provide wireless energy sharing between electrically powered vehicles. In some examples, two or more vehicles traveling on a roadway may be configured to share energy while in route to a destination. The vehicles may be equipped with wireless energy transfer units to enable the vehicles to exchange energy. At least one of the vehicles may be a mobile electric charging station configured to store a large amount of charge and to provide charge to vehicles. The electric charging station may be in communication with a controller, where the controller may be configured to identify vehicles in need of recharge and to identify at least one vehicle having sufficient charge to share. The controller may schedule a time and place for the two vehicles to meet in order to share charge. Additionally, the vehicles may be self-coordinated without a controller.

25 Claims, 8 Drawing Sheets

(56) References Cited

U.S. PATENT DOCUMENTS

| | | | |
|---|---|---|---|
| 8,772,960 B2 | 7/2014 | Yoshida | |
| 9,079,505 B1* | 7/2015 | Hyde | G06Q 10/0631 |
| 2007/0233337 A1* | 10/2007 | Plishner | G05D 1/0295 |
| | | | 701/23 |
| 2010/0065344 A1* | 3/2010 | Collings, III | B60L 11/126 |
| | | | 180/2.1 |
| 2010/0231163 A1 | 9/2010 | Mashinsky | |
| 2011/0004358 A1* | 1/2011 | Pollack | B60L 11/1842 |
| | | | 700/297 |
| 2011/0156494 A1* | 6/2011 | Mashinsky | H02J 17/00 |
| | | | 307/104 |
| 2011/0254377 A1 | 10/2011 | Wildmer et al. | |
| 2012/0299373 A1 | 11/2012 | Yoshida | |
| 2012/0299390 A1* | 11/2012 | Kim | B60L 11/182 |
| | | | 307/104 |
| 2013/0043738 A1* | 2/2013 | Park | H04M 1/7253 |
| | | | 307/104 |
| 2013/0226637 A1 | 8/2013 | Bozchalui | |
| 2014/0265555 A1* | 9/2014 | Hall | B60L 1/00 |
| | | | 307/9.1 |
| 2015/0266389 A1* | 9/2015 | Appelbaum | B60L 11/1844 |
| | | | 320/138 |
| 2015/0333540 A1* | 11/2015 | Niizuma | H02J 17/00 |
| | | | 114/312 |

OTHER PUBLICATIONS

Shwartz, M., "Wireless power could revolutionize highway transportation, Stanford researchers say," accessed at http://web.archive.org/web/20140711104820/http://news.stanford.edu/news/2012/february/wireless-vehicle-charge-020112.html?view=print, published on Feb. 1, 2012, pp. 1-3.

\* cited by examiner

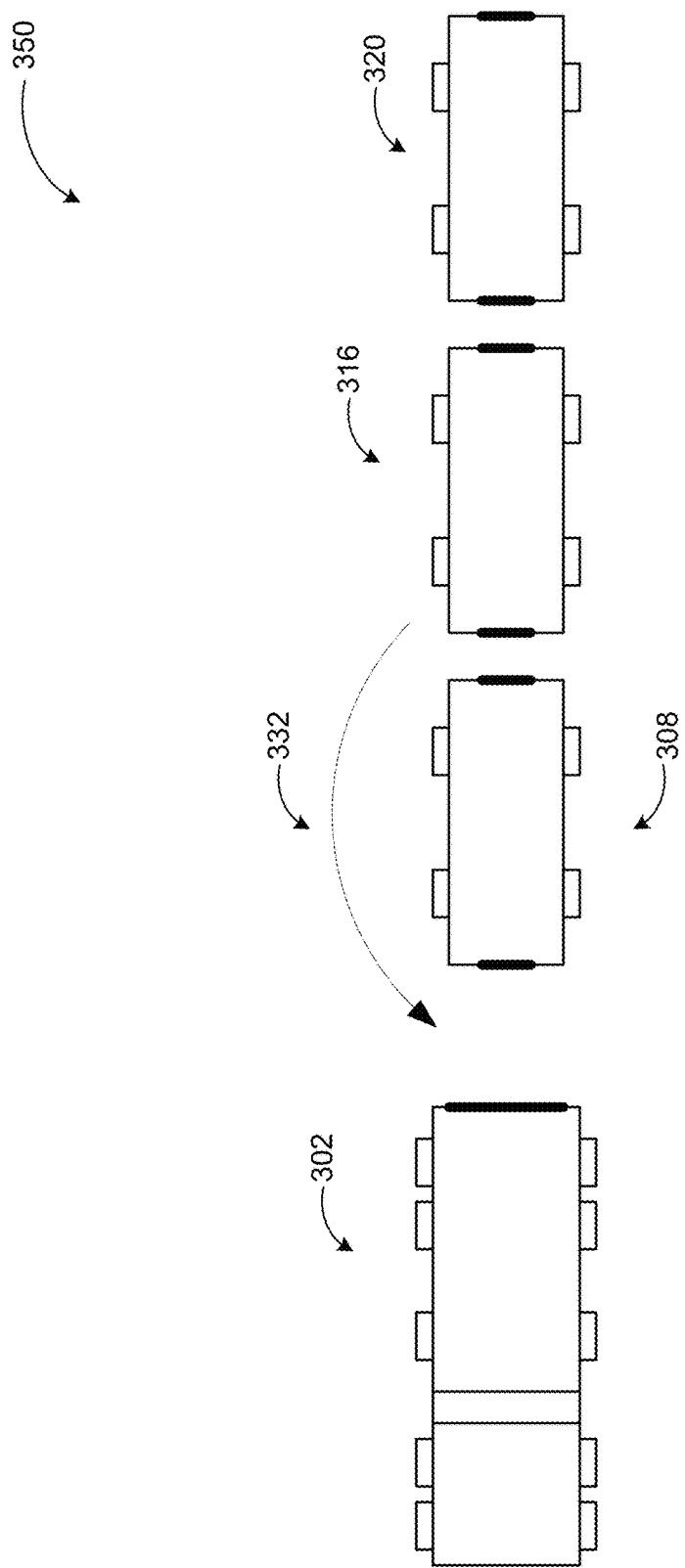

WIRELESSLY CHARGING VEHICLES MOVING IN VEHICLE CONVOY

BACKGROUND

Unless otherwise indicated herein, the materials described in the section are not prior art to the claims in the application and are not admitted to be prior art by inclusion in the section.

Electric vehicles are experiencing rapid growth in the automotive industry, and may provide an alternative to gas-fueled vehicles. Some electric vehicles may be powered by stored electricity originally transmitted from an external power source and stored on board the vehicle using a battery, flywheel, and/or supercapacitors, for example. Some electric vehicles may have a shorter operation range than gas-fueled vehicles, and so may be charged on a regular basis to maintain enough charge for vehicle operation. Additionally, charging electric vehicles may take a longer amount of time than filling up a gas tank. Traveling long distances on roadways in electric vehicles may involve regular and frequent charging in order to maintain enough charge for longer trip ranges.

SUMMARY

The present disclosure generally describes methods, apparatus, systems, devices, and/or computer program products related to providing wireless vehicle energy sharing.

According to some examples, a distributed system to provide wireless energy sharing within a vehicle convoy may be described. An example system may include a charge vehicle communicatively coupled to a plurality of vehicles in the vehicle convoy, where the charge vehicle may be configured to provide electrical energy to at least one of the plurality of vehicles and the plurality of vehicles may be configured to be powered by electrical energy and may be configured to recharge wirelessly while moving. The system may also include the at least one vehicle from the plurality of vehicles, which may be configured to determine a situation for the at least one vehicle to receive a recharge, determine that the charge vehicle may be capable to provide the recharge, position near the charge vehicle to wirelessly receive electrical energy for the recharge, and recharge through wireless energy transfer from the charge vehicle.

According to some examples, a system to provide wireless energy sharing between vehicles in a vehicle convoy may be described. An example system may include a charge vehicle configured to lead the vehicle convoy store electrical energy, and wirelessly provide the stored electrical energy to a plurality of other vehicles in the vehicle convoy, where the plurality of other vehicles may be configured to be powered by electrical energy and configured to recharge wirelessly while moving, and a controller communicatively coupled to the charge vehicle and the plurality of other vehicles. The controller may be configured to determine one or more vehicles among the plurality of other vehicles to receive a recharge, instruct the one or more vehicles to position in an order relative to the charge vehicle within the vehicle convoy to wirelessly receive electrical energy for the recharge, where the order may be determined according to remaining charge levels of the one or more vehicles, and instruct the charge vehicle to recharge the one or more vehicles after being positioned near the charge vehicle.

According to some examples, a method to provide wireless energy sharing between vehicles in a vehicle convoy may be described. An example method may include determining one or more vehicles to receive a recharge, the one or more vehicles within the vehicle convoy including a charge vehicle, the charge vehicle configured to store and provide electrical energy to the one or more vehicles, instructing the one or more vehicles to position in an order relative to the charge vehicle to receive electrical energy wirelessly for the recharge, where the order may be determined based on remaining charge levels of the one or more vehicles, and instructing the charge vehicle to recharge the one or more vehicles after being positioned near the charge vehicle.

According to some examples, a charge vehicle to provide wireless energy sharing to a plurality of vehicles within a vehicle convoy may be described. An example charge vehicle may include a wireless communication module configured to communicate with the plurality of vehicles, a power storage unit (PSU) configured to store electrical energy, a wireless energy transfer (WET) unit coupled to the PSU and configured to wirelessly provide electrical energy to one or more of the plurality of vehicles positioned near the charge vehicle, and a controller coupled to the wireless communication module, the PSU, and the WET unit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of scope, the disclosure will be described with additional specificity and detail through use of the accompanying drawings, in which:

FIGS. 3A and 3B illustrate an example of vehicles relocating in a vehicle train to receive energy wirelessly;

DETAILED DESCRIPTION

Figure 1A:
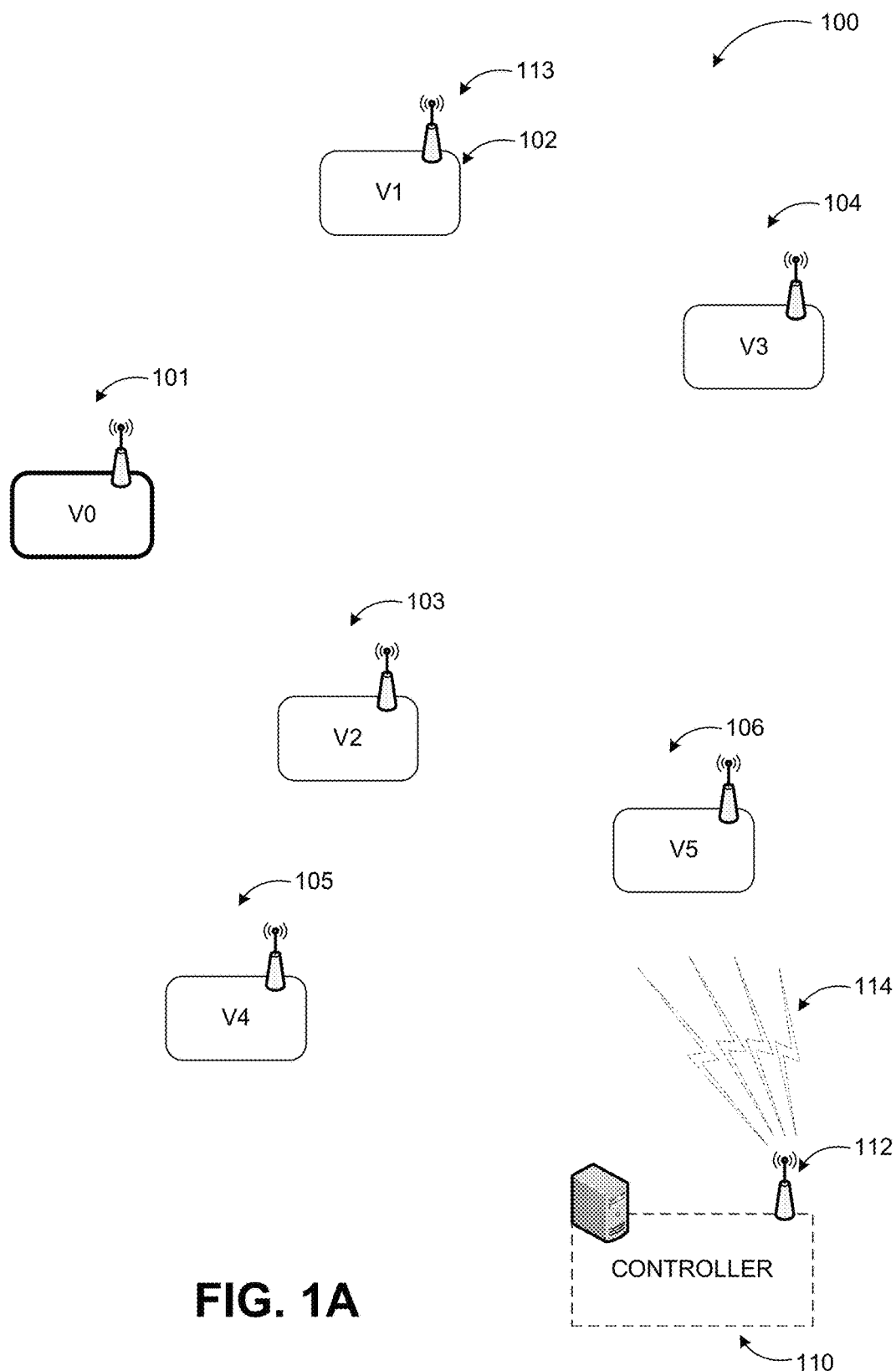
FIGS. 1A and 1B illustrate an example system of vehicles configured to communicate wirelessly and share energy through wireless transfer while in motion.

In the following detailed description, reference is made to the accompanying drawings, which form a part hereof. In the drawings, similar symbols identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, may be arranged, substituted, combined, separated, and designed in a wide variety of different configurations, all of which are explicitly contemplated herein.

The present disclosure is generally drawn, inter alia, to methods, apparatus, systems, devices, and/or computer program products related to providing wireless vehicle energy sharing.

Briefly stated, technologies are generally described for a distributed system to provide wireless energy sharing between electrically powered vehicles. In some examples, two or more vehicles traveling on a roadway may be configured to share energy while in route to a destination. The vehicles may be equipped with wireless energy transfer units to enable the vehicles to exchange energy. At least one of the vehicles may be a mobile electric charging station configured to store a large amount of charge and to provide charge to vehicles. The electric charging station may be in communication with a controller, where the controller may be configured to identify vehicles in need of recharge and to identify at least one vehicle having sufficient charge to share. The controller may schedule a time and place for the two vehicles to meet in order to share charge. Additionally, the vehicles may be self-coordinated without a controller.

Figure 1B:
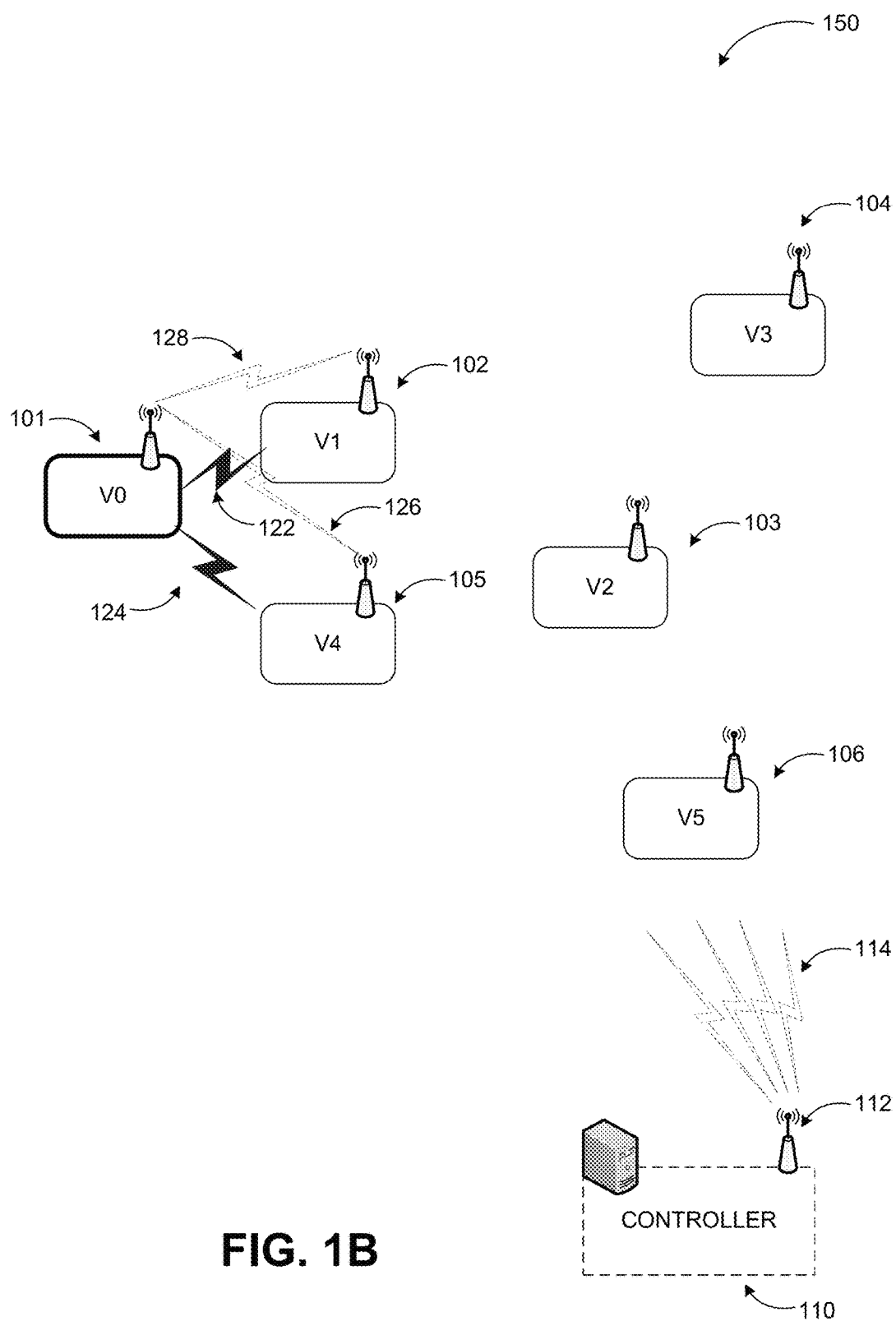

FIGS. 1A and 1B illustrate an example system of vehicles configured to communicate wirelessly and share energy through wireless transfer while in motion, arranged in accordance with at least some embodiments described herein.

In a diagram 100, a controller 110 is shown in communication 114 with one or more vehicles (e.g., vehicles 101, 102, 103, 104, 105 and 106). The controller 110 may be in communication 114 with the one or more vehicles 101-106 through a communication component 112. Each of the one or more vehicles 101-106 may also include respective communication components 113 to enable communication with the controller 114 and/or with other communication components. Example communication components 113 (which may embody antennas, transceivers, and/or related circuitry and other elements to support operation thereof) may enable one or more of a wired communication, a cellular wireless communication, an optical communication, a near field communication, a wireless local area network communication, and a wide area network communication and/or other communication between the controller and the one or more vehicles 101-106.

In an example embodiment as illustrated in a diagram 150, the one or more vehicles 101-106 may include electric vehicles. Electric vehicles may recharge frequently when in route to a destination, such as a destination that is distant in terms of miles to be traveled. In some examples, the electric vehicles may be capable of grouping together into a group, such as a vehicle convoy, while traveling. When in the group, the vehicles may communicate with each other through communication components 113, thereby enabling wireless communication. Electric energy may also be exchanged between the vehicles by using wireless energy transfer 122, 124 techniques, such as electromagnetic resonance and/or ultrasound techniques.

In some embodiments, one of the vehicles in the group may be a charge vehicle 101 having an extensive supply of electric energy sufficient to at least partially charge one or more other vehicles. Energy from the charge vehicle 101 may be wirelessly transferred 122, 124 from the charge vehicle 101 to one or more of the electric vehicles (e.g., vehicles 102, 105) in the group. The charge vehicle 101 may for example transfer energy to the vehicle that is the closest physical proximity to the charge vehicle 101, or in other embodiments, the charge vehicle 101 may transfer energy to two or more vehicles simultaneously or otherwise concurrently or near concurrently. In yet other embodiments, the charge vehicle 101 may transfer energy to the vehicle with the lowest determined charge level, even if such vehicle is not necessarily the closest in proximity to the charge vehicle 101 at the time that a recharge is needed. The charge vehicle 101 may communicate 126, 128 with the one or more vehicles 102, 105 in the group through communication components 113 as described herein to coordinate charge transfer to one or more of the vehicles. For purposes of illustration, the vehicle 101 is referred to herein as the charge vehicle—such a charge vehicle may include a vehicle that is specifically dedicated to providing charge to other vehicle (s), but may also include any of the vehicles described herein that can provide passenger/cargo transport as well as providing charge to other vehicles. Any of the other vehicles in the convoy or other solitary or grouped vehicle may also operate as a charge vehicle. Alternatively or additionally, the charge vehicle can itself be recharged when needed (e.g., when such charge vehicle is running low on charge sufficient to power itself and/or sufficient to charge other vehicles), using the methods/devices described herein, so as to obtain charge from another vehicle that is operating as a charge vehicle.

In some example embodiments, the controller 110 may facilitate grouping or otherwise organizing vehicles needing recharge near the charge vehicle 101. For example, one or more charge vehicles 101 on a roadway system may be managed by the controller 110. The controller 110 may identify one or more vehicles (for example, vehicles 102, 105) on the roadway with a need to recharge, and may instruct the one or more vehicles 102, 105 needing recharge to position near the charge vehicle 101 to receive electrical energy wirelessly for the needed recharge. The controller 110 may also instruct the charge vehicle 101 to recharge the one or more vehicles (for example, vehicles 102, 105) when positioned near the charge vehicle 101.

In some examples, the controller 110 may suggest a path for the one or more vehicles to approach the charge vehicle 101. The suggested path may be determined based on a multitude of factors. Some example factors may include remaining charge levels of the one or more vehicles, present locations of the one or more vehicles, a present location of the charge vehicle, a direction of the charge vehicle, directions of the one or more vehicles, a speed of the charge vehicle, speeds of the one or more vehicles, one or more obstacles between the charge vehicle and the one or more vehicles, and/or other factor(s) or combination(s) thereof. Additionally, the controller 110 may instruct the one or more vehicles to approach the charge vehicle 101 in a particular order/sequence according to remaining charge levels of the one or more vehicles, a distance between the charge vehicle 101 and the one or more vehicles, and/or a time of request to recharge received from each vehicle, as some examples. Furthermore, two or more vehicles may approach the charge vehicle 101 concurrently, and may receive wireless energy transfer from the charge vehicle 101 simultaneously or otherwise together. In examples, the controller 110 may instruct the one or more vehicles to position near the charge vehicle 101 by transmitting automated self-navigation instructions to a self-driving vehicle and/or transmitting instructions to a driver of the one or more vehicles.

In other example embodiments, a vehicle may request to join a charge vehicle 101 that is in route to a particular destination and/or at a particular time. Depending on energy requirements, a time, and/or a destination of the requesting vehicle, a schedule can be made to coordinate the requesting vehicle with the charge vehicle 101. For efficiency, the controller 110 may group two or more vehicles with similar destinations together, for example. The controller 110 may communicate a time and destination of where to join the charge vehicle 101 to the requesting vehicle, and the requesting vehicle may drive itself and/or use self-driving capabilities to coordinate with the charge vehicle 101.

In an example scenario, a driver desiring to travel by electric car to a destination may send a request to the controller 110 that operates one or more charge vehicles 101. The controller 110 may identify one or more charge vehicles 101 on the roadway system, and may notify the requesting driver of one or more charge vehicles 101 within a predefined range of the requesting driver and/or on a similar route to the requesting vehicle's destination. The requesting driver may select a charge vehicle 101 to join, and may join the selected charge vehicle 101 at the charge vehicle's location to recharge its vehicle.

Figure 2:
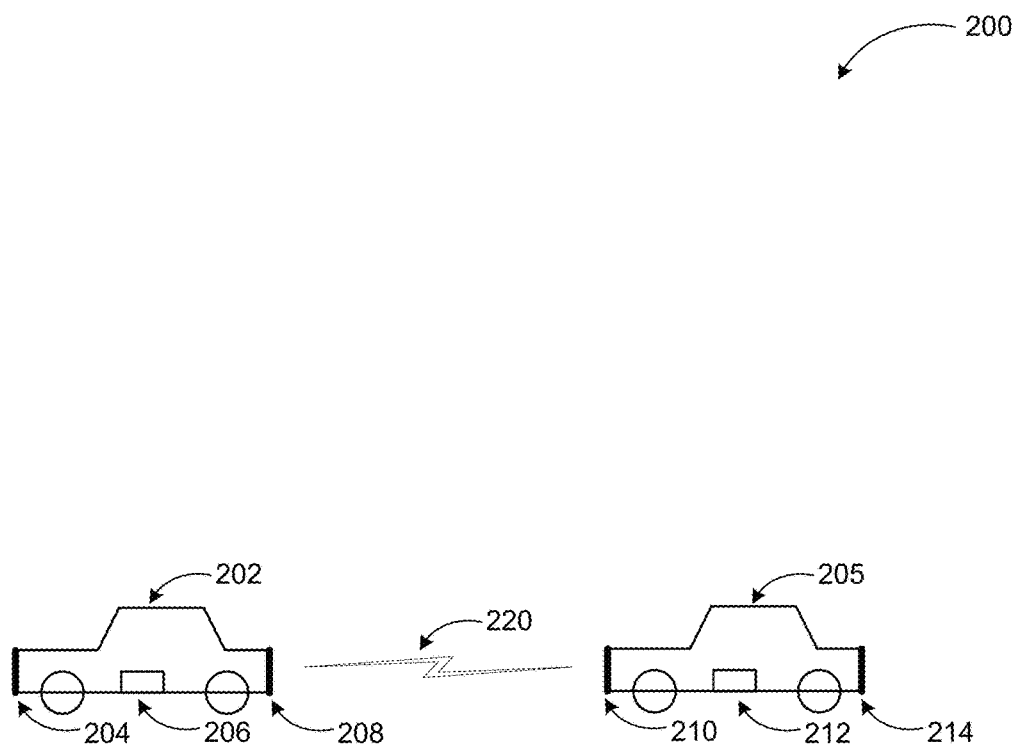
FIG. 2 illustrates an example wireless transfer of energy between two vehicles while in motion.

FIG. 2 illustrates an example wireless transfer of energy between two vehicles while in motion, arranged in accordance with at least some embodiments described herein.

A diagram 200 demonstrates a first vehicle 202 and a second vehicle 205, which may be grouped together while in route to a destination for the purpose of wireless energy transfer. The first vehicle 202 may include a battery 206 for energy storage, and one or more wireless energy transfer (WET) units 204, 208. Likewise, the second vehicle 205 (as well as other vehicles in a convoy) may also include a battery 212 and one or more WET units 210, 214.

In some examples, the first vehicle 202 and the second vehicle 24 may be part of a vehicle convoy, where a vehicle convoy may be two or more vehicles grouped together while traveling. Thus, as a third vehicle, etc. may follow in sequence behind the second vehicle 205 in the vehicle convoy and may also include a respective battery and WET units. A destination of the vehicle convoy may be determined in advance, or may be determined by one of the vehicles in the vehicle convoy, which may be a group leader. In some examples, the group leader may be a charge vehicle configured to provide energy to one or more vehicles within the vehicle convoy. In some embodiments, the charge vehicle may be the group leader to lead the vehicle convoy by being the first vehicle positioned at the front of the convoy. The charge vehicle in other embodiments may be a group leader that is positioned in other locations within the convoy, such as at the end, in the middle, and/or other positions that are not necessarily at the front of the moving vehicle convoy—in such situations, the vehicle(s) needing a recharge can position themselves in appropriate proximity (front, rear, side, etc.) relative to the charge vehicle, so as to receive a suitable recharge. In the vehicle convoy, at least some of the vehicles may be in an automated self-driving mode, and a distance between each of the vehicles may be relatively small. The vehicles in the automated self-driving mode may be configured to follow the group leader vehicle (and/or any other vehicle in front of it) without requiring active driving by a driver.

In a system according to embodiments, the WET units (e.g., WET units 204, 208, 210 and 214) may be configured to enable energy to be transferred 220 wirelessly between the first vehicle 202 and the second vehicle 205. In some examples, as demonstrated in the diagram 200, each of the first vehicle 202 and the second vehicle 205 may include WET units at the front end and the back end of the vehicle to enable the vehicles to exchange energy when the vehicles are lined up in a vehicle train configuration from front to back. For example, WET unit 204 may be at the front end and WET unit 208 may be at the back end of the first vehicle 202. The WET units (e.g., WET units 204 and 208) may also be at other locations on the vehicles. The WET units (204, 208, 210 and 214) may enable energy to be wirelessly transferred 220 from a first WET unit, such as the WET unit 208 on the back end of the first vehicle 202 to a second WET unit, such as the WET unit 210 located on the front end of the second vehicle 205. The WET unit 214 at the back end of the second vehicle 205 may, in turn, be used for wireless energy transfer with another vehicle that follows the second vehicle 205. The WET units may transfer energy employing various wireless energy transfer techniques. Some example techniques may include inductive coupling, magnetic resonance coupling, optical energy transfer, and/or ultrasound energy transfer and/or other energy transfer technique or combinations thereof. In an example, magnetic resonance coupling may allow relatively high efficiency of energy transfer, in a range of about 50%, over distances up to several meters, which may enable energy transfer when the vehicles are several meters apart. For magnetic resonance coupling, the charging distance that can be achieved may be in the order of the size of the inductor used. In case of a vehicle, an inductor of size 1×0.5 m may be integrated in the back of the car, which may allow transfer with efficiency of about 80%-90% with magnetic resonance coupling when proximity is within 1 m, for example. For a vehicle train of self-driving cars, 1 m may be a safe distance. Increased range of wireless power transfer may be achieved by increasing the size of the inductor. If this is not possible, the efficiency may be reduced. In other examples, a charge car may be specialized (e.g., a large truck) and may employ an inductor of larger size (e.g., 2×1 m) in its front and back. A speed with which the energy can be transferred 220 between WET units may depend on the wireless energy transfer technique employed.

In an example scenario of energy transfer, the battery 206 of the first vehicle 202 may be fully charged and the battery 212 of the second vehicle 205 may be less full and could benefit from a recharge. For example, the second vehicle's battery 212 may not have enough charge for the second vehicle 212 to reach to its destination. While the first vehicle 202 and the second vehicle 205 are grouped together and/or are within a vehicle convoy, energy may be transferred 220 between the WET unit 208 on the back of the first vehicle 202 and the WET unit 210 on the front of the second vehicle 205 to provide the second vehicle's battery 212 with enough charge to travel to its destination and/or to reach a certain distance where another recharge can be performed. In another embodiment, the first vehicle 202 may be a charge vehicle configured to store an abundance of energy while traveling on a roadway and to provide the stored energy to a multitude of vehicles while in motion. Such a scenario is described in further detail below in conjunction with FIGS. 3A and 3B.

Figure 3A:
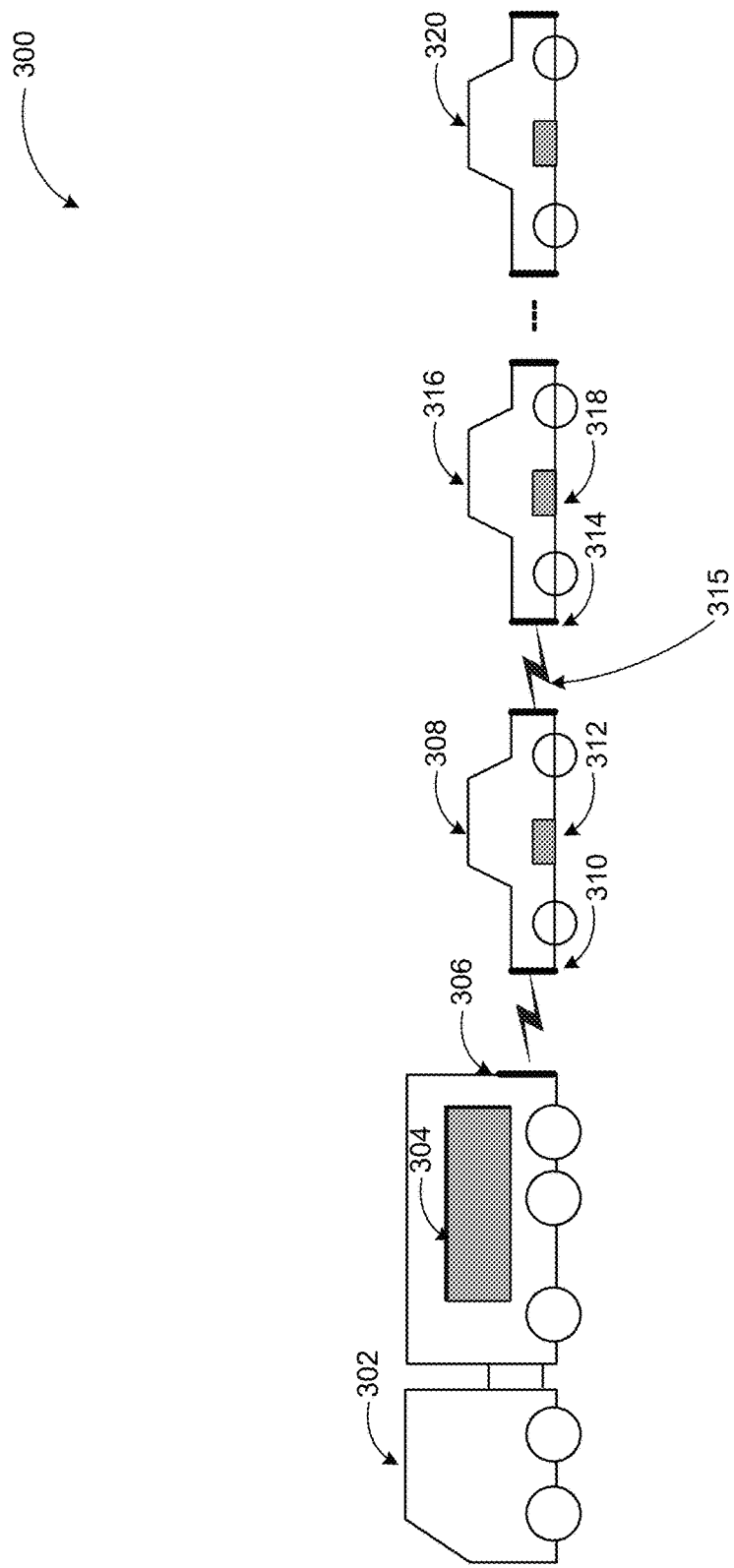

FIGS. 3A and 3B illustrate an example of vehicles relocating in a vehicle train to receive energy wirelessly, arranged in accordance with at least some embodiments described herein.

A diagram 300 demonstrates an example vehicle convoy (also called a vehicle train), which may include two or more electric vehicles (e.g., vehicles 308, 316, 320) traveling together. The vehicle convoy may be led by a group leader vehicle, which may be a charge vehicle 302, which may perform group leader tasks such as leading the other vehicles (vehicles 308, 316, 320) in the vehicle to a destination. For example, a trained driver may drive the group leader vehicle, and the other vehicles 308, 316, 320 in the convoy may automatically follow the group leader vehicle such that the drivers of the other vehicles may not have to actively drive their vehicles. As described herein, the vehicles may have a self-driving mode to automatically follow other vehicles, or the group leader, in the convoy, and the destination of the convoy may be determined in advance by the group leader vehicle. The group leader vehicle may be configured to guide the other vehicles to their destination, but may not necessarily itself have a final destination and may travel between multiple destinations continuously.

In a system according to embodiments, the group leader vehicle may be the charge vehicle 302 configured to store an abundance of energy and to provide the stored energy to the vehicles 308, 316, 320 within the convoy while traveling. The charge vehicle 302 may include an energy storage component 304 such as a battery or a capacitor array for storage of the abundance of energy. The charge vehicle 302 may also include a wireless energy transfer (WET) unit 306 to enable exchange of energy with one or more of the other vehicles 308, 316, 320 in the convoy. Each of the vehicles 308, 316, 320 in the convoy may also include at least one WET unit (e.g., WET units 310 and 314). When the vehicles 308, 316, 320 are in a vehicle convoy, the charge vehicle 302 may be configured to wirelessly supply energy to the other vehicles 308, 316, 320 by transmitting energy from its WET unit 306 to one or more of the WET units (e.g., WET units 310, 314) of the other vehicles 308, 316, 320. In some examples, the charge vehicle 302 may be associated with and managed by an electric charging station that provides wireless charging services to users on the road. The charge vehicle 302 may be used as a mobile alternative to stationary electric charging stations to enable vehicles to recharge while traveling to a destination without having to leave the vehicle convoy to stop and recharge at a charging station. Furthermore, a controller (such as the controller 110 of FIG. 1) may be configured to manage wireless energy transfer between vehicles in order to bill a vehicle accordingly for receiving energy from the charge vehicle 302 while traveling. The controller may be associated with the stationary charging station and/or may be an independent controller. The controller may also be located in any of the vehicles in the vehicle convoy (for example, located in a charge vehicle or in one of the vehicles in the vehicle convoy that follows the charge vehicle), may be located in a vehicle that is not part of the vehicle convoy, may be located in a stationary location, and/or may be otherwise located elsewhere.

In further examples, the vehicles 308, 316, 320 may be configured to exchange energy with each other directly instead of directly from the charge vehicle 302. For example, the first vehicle 308 in the vehicle convoy may have extra charge or energy to share, and the second vehicle 316 may need charge (or energy). The first vehicle 308 may wirelessly transfer 315 its extra energy to the second vehicle 316 with the charge shortage through their respective WET units. The vehicle providing energy for recharge may be configured to bill the vehicle receiving the energy. The price to receive energy from another vehicle may be higher than receiving energy directly from the charge vehicle 302, which may provide an incentive for users of vehicles to share energy.

In some examples, as illustrated in a diagram 350 of FIG. 3B, two or more vehicles may exchange their location in a vehicle convoy in order to enable a vehicle needing recharge to move closer to the charge vehicle. When a vehicle that is part of the vehicle convoy needs or desires to recharge, the order of the vehicles may be changed to facilitate the transfer of energy wirelessly to this vehicle. For example, vehicle 316 may exchange 332 its place with vehicle 308. This may have the effect that the distance between the group leader charge vehicle 302 and the vehicle 316 is reduced to enable more efficient wireless energy transfer.

As previously described herein, a controller (such as the controller 110) may manage an order of the vehicles within the convoy to facilitate efficient energy transfer. The controller may suggest a path and an order for the one or more vehicles to approach the charge vehicle 302. The suggested path and order may be determined based on a multitude of factors. Some example factors may include remaining charge levels of the one or more vehicles, present locations of the one or more vehicles, a distance between the charge vehicle 302 and the one or more vehicles, a present location of the charge vehicle, a direction of the charge vehicle, directions of the one or more vehicles, a speed of the charge vehicle, speeds of the one or more vehicles, one or more obstacles between the charge vehicle and the one or more vehicles, and/or a time of request to recharge received from each vehicle, as some examples. Other factors or combinations thereof may also be considered. The controller may instruct the one or more vehicles to position near the charge vehicle 302 by transmitting automated self-navigation instructions to a self-driving vehicle and/or transmitting instructions to a driver of the one or more vehicles. The other vehicles in the convoy may also receive instructions to allow the one or more vehicles to move into their new positions within the vehicle convoy, such as instructions to increase space(s) between such other vehicles so as to enable the one or more vehicles to move into the increased spaces that have been created.

In some example embodiments, energy may be exchanged when vehicles are within a predefined range of one another, without taking into account factors such as a route and destination of the vehicles. In other example embodiments, a scheduled approach may enable coordination of energy exchange between vehicles on a roadway taking into account factors such as a destination and a planned route of the vehicles. In the scheduled approach, coordinated energy exchange between vehicles may be facilitated by a controller and/or the vehicles themselves.

In an example embodiment of a scheduled approach to coordinate energy exchange between vehicles taking into account a destination and route, a vehicle traveling to a predefined destination may plan a route to an intended destination. The route planning may be performed with input of the user such as types of roads to take, for example. The route planning may also estimate a time the vehicle will be at a location on the route. Given the route planning, the vehicle may determine an amount of energy, E, that may be required to reach its destination, and whether it has an energy shortage or energy abundance. In some cases, the destination may be the final destination of the vehicle, and in some cases the destination may be an intermediary planned stop where the vehicle may recharge. After determination of the energy shortage or energy abundance, the vehicle's planned route, estimated route timing, and energy shortage or abundance information may be shared with other vehicles and/or a controller configured to coordinate scheduling of the vehicle needing energy with one or more vehicles having energy to share.

In some examples, energy shortage or abundance may be estimated based on factors such as a distance to the destination, a current speed of travel, and current energy usage.

Other factors such as traffic conditions and elevation along the road to the destination may be taken into account also. For instance, the vehicle may estimate its required energy as $E = P \times d_r/v_c$, where P is the power usage in Watts (W) or Joules per second (J/s), $d_r$ is the remaining distance in meters and $v_c$ is the current speed in meters per second (m/s). Instead of the current speed, the average journey speed may be used also.

Based on energy still available in the batteries of the vehicle, $E_{BAT}$, an energy shortage $E_{SHORT}$ may be defined as $E_{SHORT} = E - E_{BAT}$. If $E_{SHORT}$ is positive, then there may be energy shortage, and if $E_{SHORT}$ is negative, then there may be an abundance of energy to reach the destination. If there is an energy shortage, then actions may be performed to coordinate the vehicle having the energy shortage with a charge vehicle and/or another vehicle having an abundance of energy, as described in further detail herein. If there is an energy abundance, at least a portion of the energy may be available for sharing with other vehicles. The energy that the vehicle may share may be $E_{SHARE}$. The portion of the energy available for sharing may depend on several factors. For instance, the vehicle may limit the available portion to approximately 80% to make sure that some backup energy is available. Furthermore, the vehicle may need to return and there may not be an opportunity for fully recharging its batteries. In such a case, not only the destination is taken into account, but also the fact that the vehicle needs to return.

As described herein, the vehicle's planned route, estimated route timing, and energy shortage or abundance information may be made available and/or shared with other vehicles. To share the route, timing, and energy information, the vehicle may send the information to a server that maintains a database that is updated in real-time. A facilitator or controller (such as the controller 110) for vehicle energy sharing may maintain such database and may be configured to coordinate scheduling of energy transfer between vehicles. In another example, a peer-to-peer distribution technique may be employed, where vehicles may directly exchange information with each other, without the use of a central database.

Based on the information shared by the vehicle(s), an overlap between routes taken by two or more vehicles may be determined such that vehicles that have an energy shortage may share the road for at least a portion of a trip with one or more vehicles that have an energy abundance. There may be several approaches in which route and energy information may be used to schedule energy transfer between vehicles.

In an example approach, each of the vehicles that has an energy shortage to reach a destination may independently determine the intersection of its own route with the routes taken by other vehicles based on the information shared by these vehicles. Alternatively, a controller may determine the intersection of a vehicle having an energy shortage with one or more vehicles having an energy abundance. These vehicles may then be contacted to reserve an amount of energy to share with the vehicle in need of energy. A process that may be implemented by the vehicles to determine the intersection of its own route with the routes taken by other vehicles may be first to generate a list of vehicles for which the route intersects with the route of the vehicle under consideration. Such an intersection may be both a spatial intersection (e.g., vehicles traveling on the same road) and a temporal intersection (e.g., vehicles are near each other while traveling on the road). The process may be performed by the controller or by an individual vehicle, independently. Subsequently, a subset of vehicles from which to receive energy may be selected from the generated list.

An example process to determine the subset of vehicles, which may be performed by the controller (such as the controller 110) or by an individual vehicle independently, may be as follows. An initial list, I, may be generated where the list may include one or more vehicles that share part of the route with the vehicle having an energy shortage and also includes each vehicle's corresponding energy available to share, $E_{SHARE}$. In a first operation, an empty list, may be initialized together with a variable $E_R$, where $E_R$ signifies the amount of energy that may be received from the one or more vehicles on the initial list, I. Subsequently, in a second operation, a vehicle on the initial list, I, that has the largest $E_{SHARE,id}$ may be identified. A variable $E_{SHARE,max}$ may be set to this $E_{SHARE,id}$. The identified vehicle having largest $E_{SHARE,id}$ may be removed from the initial list, I, and added to the list, L. In a third operation of the process, the value of $E_{SHARE,max}$ may be added to the $E_R$. In a fourth operation of the process, the initial list, I, of input vehicles may be updated to account for a fact that some of the vehicles on the list, I, may share a same portion of their routes, and the value of $E_{SHARE,id}$ of such second vehicle may be modified in response. For example, if a first vehicle is selected and added to the list, L, a second vehicle that shares a same portion of the route with the first vehicle may not be used to receive energy from when energy is received from the first vehicle (assuming a vehicle is receiving energy from one vehicle at a time).

Subsequently, the controller and/or the vehicle needing energy may determine if the total amount of energy that can be received from the vehicles on the list, L, is sufficient to reach the destination. If there is sufficient energy, then the process ends, and the output of the process is the list, L, which may provide a list of vehicles from which to receive energy. If there is not sufficient energy from the vehicles on the list, the process may return to the second operation to identify additional vehicles having energy to share. Additionally, at some point the list, I, may be empty, and the process may terminate and output the current list, L.

After determination of the subset of candidate vehicles from which to receive energy, each of the candidate vehicles may be contacted by either the vehicle needing energy and/or the controller, and may be instructed to reserve a defined amount of energy to share. The vehicle needing energy may continue on its originally planned route with some alternations in order to meet up with one or more of the identified vehicles from which to receive energy. For example, the vehicle may alter its speed to be able to catch up with the vehicles from which energy will be received. The vehicle needing energy may also alter a route to spatially and temporally intersect with one or more of the identified vehicles based on a number of factors. The vehicle needing energy and/or the controller may determine a suggested path and time for the vehicle needing energy to approach a vehicle providing energy based on one or more a remaining charge level of the vehicle, a present location of the vehicle needing energy and a vehicle providing energy, a direction of the vehicle needing energy and a vehicle providing energy, a speed of the vehicle needing energy and a vehicle providing energy, and one or more obstacles between the vehicle needing energy and a vehicle providing energy, and/or other factors or combination thereof. The vehicle needing energy may follow the suggested path to meet up with one or more vehicles providing energy. In further examples, one or more of the vehicles may no longer be able to share energy, and a vehicle planning on receiving energy from such vehicles may execute the process of identifying alternative candidate vehicles from which to receive energy.

In further embodiments, an opportunistic approach may be performed where vehicles that are in close proximity to each other may initiate a transfer of energy without central organization or scheduled planning. The opportunistic approach may be implemented by vehicles that are willing to share part of their energy and/or vehicles wanting to receive energy. Each of the vehicles may independently drive towards its destination, and during the journey, there may be other vehicles in close proximity with which energy could be exchanged.

In an example opportunistic approach, a first vehicle may determine its energy abundance or shortage given its destination and planned journey parameters. The energy abundance and/or shortage may be determined as described above where multiple factors may be taken into account. For instance the vehicle may estimate its required energy as $E=Pxd_r/v_c$, where P is the power usage in W or J/s, $d_r$ is the remaining distance in meters and $v_c$ is the speed in m/s. Based on the energy still available in the batteries, $E_{BAT}$, of the vehicle an energy shortage, $E_{SHORT}$, may be defined as $E_{SHORT}=E-E_{BAT}$. If $E_{SHORT}$ is positive there is energy shortage, and if $E_{SHORT}$ is negative there is an abundance of energy to reach the destination.

When $E_{SHORT}$ is positive, the vehicle may require additional energy, and the vehicle may query one or more other vehicles in close proximity for energy abundance. Close proximity may be a predefined range such as a 5 mile radius, for example, though any range may be defined. The queried one or more vehicles may return their willingness (or not) to share energy and the amount of energy that can be shared. There may be several techniques in which a vehicle may query vehicles in close proximity. For example, a short range communication technology such as Bluetooth or visible light communications may be used to communicate with vehicles that are nearby. In another example, vehicles may periodically send their global positioning system (GPS) coordinates to a central station or server by using, for instance, 3G or 4G communication technology. A request may be sent to the server to return a list of vehicles that are within a predefined range of the received GPS coordinates. Querying one or more vehicles in a predefined close proximity may enable the requesting vehicle to reach one or more vehicles with which to exchange energy without significant changes in travel speed or route.

Next, for example, the server may return a list of vehicles that have an abundance of energy and are able to share at least a portion of their energy. Subsequently, the server and/or the requesting vehicle may select one of the vehicles from the list from which to receive energy. In an example process for selection of the vehicle from the list, elements of the list may be defined by a pair (id, $E_{SHARE,id}$) where id stands for the identity of the vehicle on the list and $E_{SHARE,id}$ stands for the energy it has available for sharing. A first option may be to choose a vehicle on the list for which $E_{SHARE,id}$ has the largest value, which may ensure that a maximum amount of energy can be received. However, the requesting vehicle may not require a full amount of $E_{SHARE,id}$ to reach the destination. Another possibility may be to choose the vehicle that has the smallest $E_{SHARE,id}$ for which $E_{SHARE,id}>E_{SHORT}$, where $E_{SHORT}$ is the energy that is required to reach the destination. This may allow the requesting vehicle to receive enough energy to reach its destination, and may enable other vehicles to remain available for other vehicles that may require a larger amount of energy to reach their destination.

In another embodiment, the selection of a vehicle from the list of vehicles that have an abundance of energy may also be based on additional factors. For instance, other vehicles may not only advertise the amount of energy available for sharing, $E_{SHARE,id}$, but also at least a portion of their planned routes. Since vehicles on the list may have different final destinations and may leave the road at different times, a full amount of available energy, $E_{SHARE,id}$, may not be available for sharing. Knowing at least a portion of the planned route of the vehicles on the list may allow the value of $E_{SHARE,id}$ to be adjusted such that an actual amount of available energy that can be shared may be taken into account. A process incorporating the planned routes may be to provide a list of vehicles within a predefined proximity with available energy to share including at least a portion of a planned route and/or final destination for each of the vehicles on the list. A route may be defined as a sequence of GPS coordinates, a series of mile markers, and/or road entries and exits, as some examples. An overlap between the route of the requesting vehicle and each of the vehicles on the list may be determined. The overlap may include a location and/or an amount of time the requesting vehicle may be traveling on the same road as the vehicles on the list. Subsequently, a corresponding amount of energy, $E_{id,act}$, that can be shared during the time the vehicles are within a predefined range of each other may be determined. Next, a vehicle on the list with a smallest $E_{id,act}$ such that $E_{id,act}>E_{SHORT}$ may be selected. The requesting vehicle may then exchange energy with the selected vehicle through WET units incorporated with each of the vehicles. In some cases, either and/or both of the vehicles may change its speed and/or direction such that both vehicles may be in a preferred position for efficient wireless energy transfer.

In an example scenario, a first user (User A) may be traveling by car from San Francisco to Los Angeles, which is approximately a 380-mile drive. User A may have an electric vehicle with self-driving capabilities that has a range of 300 miles when fully charged. User A starts its journey with a fully charged vehicle and selects to travel to Los Angeles. A vehicle control system determines that there is an energy shortage that corresponds to about 80 miles. While driving on the highway the vehicle may periodically query vehicles within a predefined range for an energy abundance. In the example, for the first 150-200 miles, the highway may not be very crowded and there may be no vehicles in the near environment of user A that have an abundance of energy. The situation may change when a vehicle of a user (User B) enters the highway to travel from Coalinga to Bakersfield. User B may have a similar electric vehicle as User A with a range of 300 miles. Furthermore, the vehicle of User B may have a fully charged battery. Since the trip from Coalinga to Bakersfield is only 100 miles, the vehicle of User B may have an energy abundance corresponding to 200 miles. Shortly after User B has entered the highway, the vehicle of User A may perform queries for vehicles having an energy abundance. The vehicle of User B may signal to the vehicle of User A that it has energy abundance and is willing to share. Furthermore, the vehicle of User B may signal that it is traveling from Coalinga to Bakersfield. The vehicle of User A may execute the process described herein to select a vehicle in the near environment from which to receive energy. First, an overlap between the routes may be determined as about 80 miles. Second, it may be determined that the overlap implies the vehicles will be in each other's near environment for at least for 1 hour. Furthermore, the vehicles have wireless charging technology that allows charging at a rate of 100 miles of range per hour. In this case, the vehicle of User B may be the only vehicle near the vehicle of User A, and the vehicles may position themselves to allow for efficient wireless energy transfer. During the hour in which they are in each other's near proximity, an amount of energy may be transferred from the vehicle of User B to the vehicle of User A corresponding to a range of 90 miles, which may enable User A to make the trip from San Francisco to Los Angeles without needing to stop for recharging. Furthermore, User B may still able to make it to its final destination.

Figure 4:
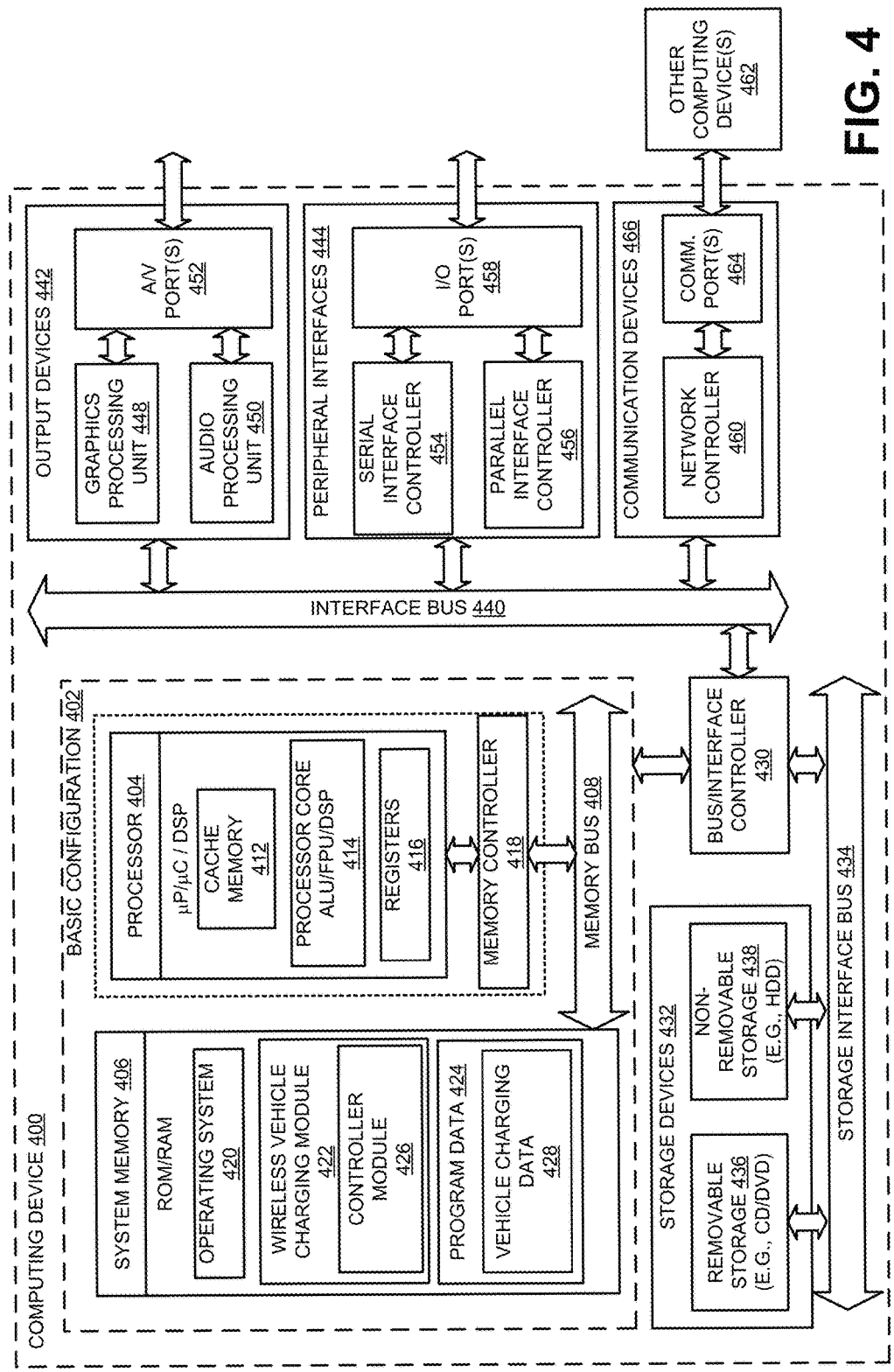
FIG. 4 illustrates a general purpose computing device, which may be configured to be used in connection with wireless vehicle energy sharing.

FIG. 4 illustrates a general purpose computing device 400, which may be configured to be used in connection with wireless vehicle energy sharing, arranged in accordance with at least some embodiments described herein. For example, the computing device may be used to implement the controller 110, may be implemented as part of a vehicle in a vehicle convoy, may be implemented in a vehicle outside of the vehicle convoy, may be implemented in a stationary (e.g., non-vehicle) location, etc.

For example, the computing device 400 may be used to implement wireless vehicle energy sharing as described herein. In an example basic configuration 402, the computing device 400 may include one or more processors 404 and a system memory 406. A memory bus 408 may be used to communicate between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one or more levels of caching, such as a cache memory 412, a processor core 414, and registers 416. The example processor core 414 may include an arithmetic logic unit (ALU), a floating point unit (FPU), a digital signal processing core (DSP core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, a wireless vehicle charging module 422 and program data 424. The wireless vehicle charging module 422 may include a controller module 426 to facilitate coordination of a charge vehicle with one or more vehicles in need of charging and the subsequent re-charging of the vehicles. The program data 424 may include vehicle charging data 428 which may include data related to vehicles having charge to share and vehicles in need of charging as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 460, which may be arranged to facilitate communications with one or more other computing devices 462 over a network communication link via one or more communication ports 464.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Figure 5:
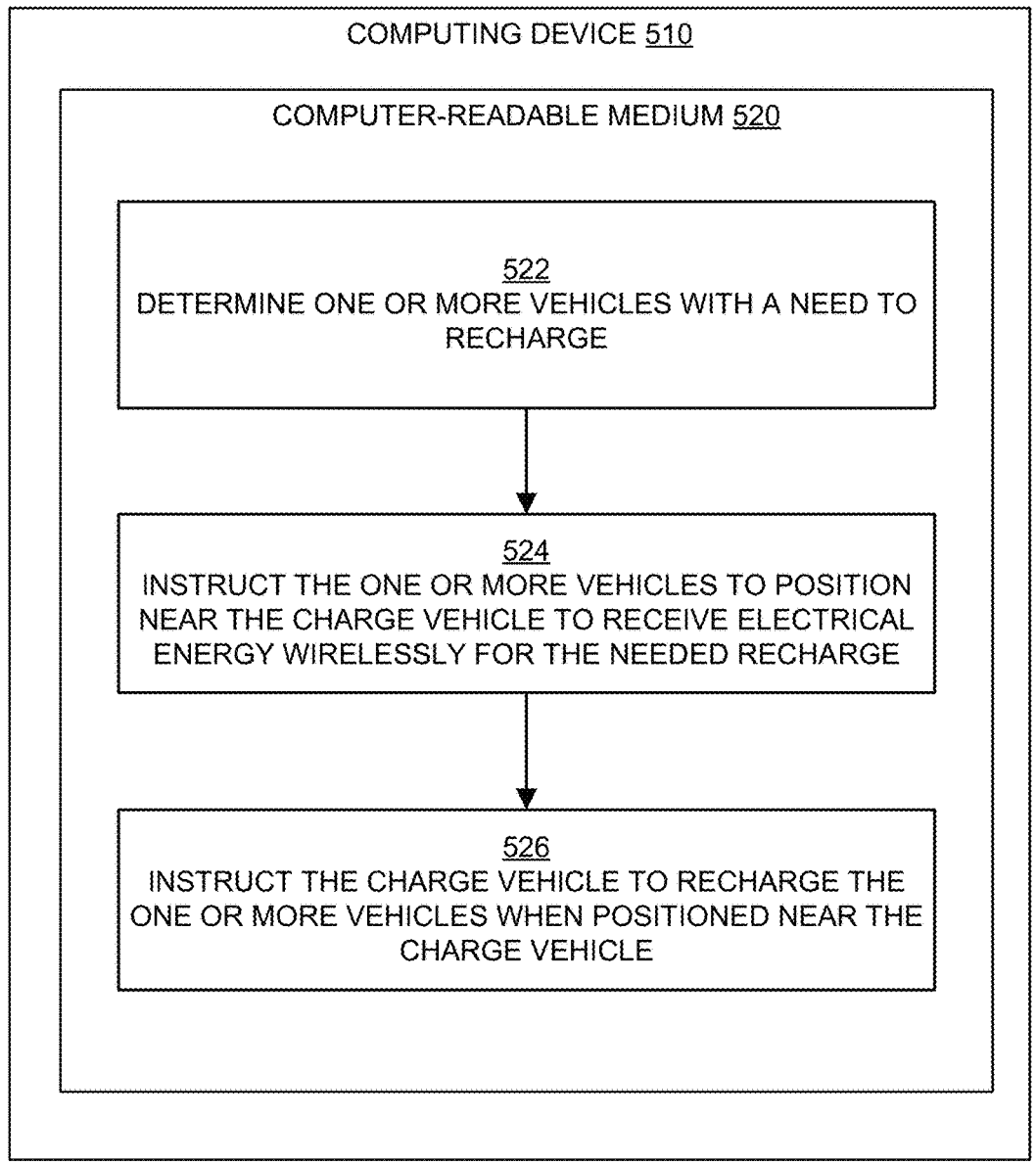
FIG. 5 is a flow diagram illustrating an example method to provide wireless vehicle energy sharing in a centrally controlled system, which may be performed or otherwise controlled by a computing device such as the computing device in FIG. 4.

FIG. 5 is a flow diagram illustrating an example method to provide wireless vehicle energy sharing in a centrally controlled system, which may be performed or otherwise controlled by a computing device 510 such as the computing device in FIG. 4, arranged in accordance with at least some embodiments described herein.

Example methods may include one or more operations, functions or actions as illustrated by one or more of blocks 522, 524, and/or 526, and may in some embodiments be performed by a computing device such as the computing device 510 in FIG. 5. The operations described in the blocks 522-526 may also be performed in response to execution of computer-executable instructions stored in a computer-readable medium, such as a computer-readable medium 520 of a computing device 510. Other technique for performing the depicted operations may be used. Further, the depicted operations need not necessarily be performed in the precise order shown. Also, various operations may be added, removed, modified, and/or combined.

An example process to provide wireless vehicle energy sharing in a centrally controlled system may begin with block 522, "DETERMINE ONE OR MORE VEHICLES WITH A NEED TO RECHARGE," where a vehicle having a shortage of energy to reach a predefined destination may be identified by a controller managing a wireless energy sharing system or a controller on the vehicle. A shortage of energy may be determined as described herein.

Block 522 may be followed by block 524, "INSTRUCT THE ONE OR MORE VEHICLES TO POSITION NEAR A CHARGE VEHICLE TO RECEIVE ELECTRICAL ENERGY WIRELESSLY FOR THE NEEDED RECHARGE," where the one or more vehicles with a need to recharge or that could otherwise benefit from a recharge may be instructed by the controller managing the wireless energy sharing system to position near a vehicle having an abundance of energy to share, such as a charge vehicle. The one or more vehicles to be recharged may be members of a vehicle convoy led by a group leader vehicle, where the group leader vehicle may be a charge vehicle storing an abundance of energy.

Block 524 may be followed by block 526, "INSTRUCT THE CHARGE VEHICLE TO RECHARGE THE ONE OR MORE VEHICLES WHEN POSITIONED NEAR THE CHARGE VEHICLE," where the charge vehicle may wirelessly transfer a defined amount of energy to the one or more vehicles needing recharge through one or more wireless energy transfer units incorporated with each of the vehicles. The charge vehicle may transfer energy to one vehicle at a time or may transfer energy to two or more vehicles concurrently. The controller managing the wireless energy sharing system may instruct the charge vehicle to perform the energy transfer, as well as instructing the one or more vehicles to receive the energy transfer. In another embodiment, the charge vehicle may be another vehicle having an abundance of energy to share and located within a predefined range of the vehicle needing recharge. The vehicle to be recharged may identify a vehicle having available charge to share and may position itself near the vehicle to facilitate energy exchange. Furthermore, the controller may facilitate coordination of meeting and exchanging energy between vehicles.

Figure 6:
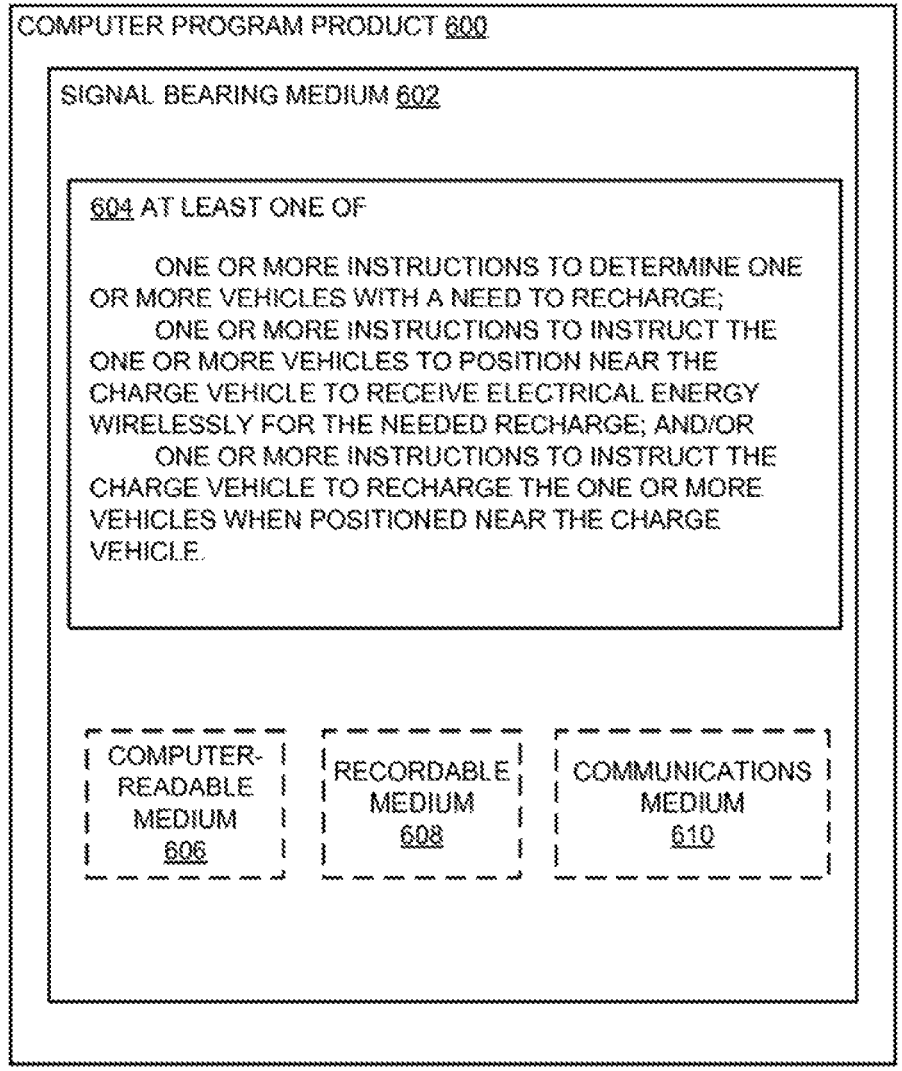
FIG. 6 illustrates a block diagram of an example computer program product, all arranged in accordance with at least some embodiments described herein.

FIG. 6 illustrates a block diagram of an example computer program product, arranged in accordance with at least some embodiments described herein. In some examples, as shown in FIG. 6, a computer program product 600 may include a signal bearing medium 602 that may also include one or more machine readable instructions 604 that, in response to execution by, for example, a processor may provide the functionality and features described herein. Thus, for example, referring to the processor 404 in FIG. 4, the wireless vehicle charging module 422 may undertake one or more of the tasks shown in FIG. 6 in response to the instructions 604 conveyed to the processor 404 by the signal bearing medium 602 to perform actions associated with providing wireless vehicle energy sharing in a centrally controlled system as described herein. Some of those instructions may include, for example, instructions to determine one or more vehicles with a need to recharge, instruct the one or more vehicles to position near a charge vehicle to receive electrical energy wirelessly for the needed recharge, and/or instruct the charge vehicle to recharge the one or more vehicles when positioned near the charge vehicle, according to some embodiments described herein.

In some implementations, the signal bearing medium 602 depicted in FIG. 6 may encompass a computer-readable medium 606, such as, but not limited to, a hard disk drive (HDD), a solid state drive (SSD), a compact disk (CD), a digital versatile disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communication link, a wireless communication link, etc.). Thus, for example, the computer program product 600 may be conveyed to one or more modules of the processor 404 by an RF signal bearing medium, where the signal bearing medium 602 is conveyed by the wireless communications medium 610 (e.g., a wireless communications medium conforming with the IEEE 802.11 standard).

According to some examples, a distributed system to provide wireless energy sharing within a vehicle convoy may be described. The system may include a charge vehicle communicatively coupled to a plurality of vehicles in the vehicle convoy, where the charge vehicle may be configured to provide electrical energy to at least one of the plurality of vehicles and the plurality of vehicles may be configured to be powered by electrical energy and may be configured to recharge wirelessly while moving. The system may also include the at least one vehicle from the plurality of vehicles, which may be configured to determine a situation for the at least one vehicle to receive a recharge, determine that the charge vehicle may be capable to provide the recharge, position near the charge vehicle to wirelessly receive electrical energy for the recharge, and recharge through wireless energy transfer from the charge vehicle.

According to some examples, the at least one vehicle in the plurality of vehicles may be configured to exchange a position in the vehicle convoy with another vehicle in the plurality of vehicles according to remaining charge levels of the at least one vehicle and the other vehicle. The charge vehicle may be further configured to instruct two or more of the plurality of vehicles to approach the charge vehicle in an order according to remaining charge levels of the two or more vehicles or a time of request to recharge received from each vehicle.

According to some examples, the charge vehicle may be further configured to provide the electrical energy to two or more of the plurality of vehicles simultaneously. The charge vehicle and the plurality of vehicles include one or more of: a car, a truck, a bus, a van, a boat, a ship, or a robotic vehicle. The at least one vehicle may be configured to position near the charge vehicle by one of automated self-navigation based on instructions received from the charge vehicle or presentation of instructions to approach the charge vehicle to a driver of the at least one vehicle.

According to other examples, the charge vehicle may be further configured to determine a suggested path for the at least one vehicle to approach the charge vehicle based on one or more of a remaining charge level of the at least one vehicle, a present location of the at least one vehicle, a present location of the charge vehicle, a direction of the charge vehicle, a direction of the at least one vehicle, a speed of the charge vehicle, a speed of the at least one vehicle, and one or more obstacles between the charge vehicle and the at least one vehicle, and transmit the suggested path to the at least one vehicle.

According to further examples, the at least one vehicle may be further configured to determine a suggested path for the at least one vehicle to approach the charge vehicle based on one or more of a remaining charge level of the at least one vehicle, a present location of the at least one vehicle, a present location of the charge vehicle, a direction of the charge vehicle, a direction of the at least one vehicle, a speed of the charge vehicle, a speed of the at least one vehicle, and one or more obstacles between the charge vehicle and the at least one vehicle.

According to some examples, a system to provide wireless energy sharing between vehicles in a vehicle convoy may be described. The system may include a charge vehicle configured to lead the vehicle convoy store electrical energy, and wirelessly provide the stored electrical energy to a plurality of other vehicles in the vehicle convoy, where the plurality of other vehicles may be configured to be powered by electrical energy and configured to recharge wirelessly while moving, and a controller communicatively coupled to the charge vehicle and the plurality of other vehicles. The controller may be configured to determine one or more vehicles among the plurality of other vehicles to receive a recharge, instruct the one or more vehicles to position in an order relative to the charge vehicle within the vehicle convoy to wirelessly receive electrical energy for the recharge, where the order may be determined according to remaining charge levels of the one or more vehicles, and instruct the charge vehicle to recharge the one or more vehicles after being positioned near the charge vehicle.

According to some examples, in order to instruct the one or more vehicles to position in the order relative to the charge vehicle, the controller may be configured to instruct the one or more vehicles to position behind the charge vehicle in an order according to a distance between the charge vehicle and the one or more vehicles, or a time of request to recharge received from each vehicle.

According to some examples, in order to wirelessly provide the stored electrical energy, the charge vehicle may be configured to provide the electrical energy to two or more vehicles simultaneously, and where the controller may be further configured to instruct the two or more vehicles to approach the charge vehicle at a same time. The charge vehicle and the plurality of other vehicles include one or more of a car, a truck, a bus, a van, a boat, a ship, or a robotic vehicle.

According to other examples, the charge vehicle and the plurality of other vehicles include robotic vehicles and the controller may be configured to provide one of navigation or instructions for automated self-navigation.

According to some examples, in order to instruct the one or more vehicles to position in the order relative to the charge vehicle, the controller may be configured to instruct the one or more vehicles to position in an order behind the charge vehicle by one of transmission of automated self-navigation instructions or transmission of instructions to be presented to a driver of the one or more vehicles.

According to further examples, the controller may be further configured to determine a suggested path for the one or more vehicles to approach the charge vehicle based on one or more of remaining charge levels of the one or more vehicles, present locations of the one or more vehicles, a present location of the charge vehicle, a direction of the charge vehicle, directions of the one or more vehicles, a speed of the charge vehicle, speeds of the one or more vehicles, and one or more obstacles between the charge vehicle and the one or more vehicles, and transmit the suggested path to the one or more vehicles.

According to yet other examples, the controller may include a communication module configured to communicate with the charge vehicle and the plurality of other vehicles through one or more of cellular wireless communication, wide area network (WAN) wireless communication, or satellite communication.

According to some examples, a method to provide wireless energy sharing between vehicles in a vehicle convoy may be described. The method may include determining one or more vehicles to receive a recharge, the one or more vehicles within the vehicle convoy including a charge vehicle, the charge vehicle configured to store and provide electrical energy to the one or more vehicles, instructing the one or more vehicles to position in an order relative to the charge vehicle to receive electrical energy wirelessly for the recharge, where the order may be determined based on remaining charge levels of the one or more vehicles, and instructing the charge vehicle to recharge the one or more vehicles after being positioned near the charge vehicle.

According to some examples, the method may include determining a suggested path for the one or more vehicles to approach the charge vehicle based on one or more of remaining charge levels of the one or more vehicles, present locations of the one or more vehicles, a present location of the charge vehicle, a direction of the charge vehicle, directions of the one or more vehicles, a speed of the charge vehicle, speeds of the one or more vehicles, and one or more obstacles between the charge vehicle and the one or more vehicles.

According to some examples, instructing the one or more vehicles to position in the order relative to the charge vehicle may include instructing the one or more vehicles to approach the charge vehicle in an order according to remaining charge levels of the one or more vehicles, a distance between the charge vehicle and the one or more vehicles, or a time of request to recharge received from each vehicle.

According to other examples, instructing the one or more vehicles to position in the order relative to the charge vehicle may include instructing the one or more vehicles to approach the charge vehicle at a same time, where instructing the charge vehicle to recharge the one or more vehicles includes instructing the charge vehicle may be configured to provide the electrical energy to two or more vehicles simultaneously.

According to yet other examples, instructing the one or more vehicles to position in the order relative to the charge vehicle may include instructing the one or more vehicles to position near the charge vehicle by one of transmission of automated self-navigation instructions or transmission of instructions to be presented to a driver of the one or more vehicles.

According to further examples, the method may include identifying one of the vehicles in the vehicle convoy as having extra charge, identifying another of the vehicles in the vehicle convoy as having a charge shortage, instructing the vehicle having the charge shortage to position itself near the vehicle having the extra charge to receive electrical energy wirelessly for a recharge, and instructing the vehicle having extra charge to provide electrical energy to the vehicle having the charge shortage.

According to some examples, a charge vehicle to provide wireless energy sharing to a plurality of vehicles within a vehicle convoy may be described. The charge vehicle may include a wireless communication module configured to communicate with the plurality of vehicles, a power storage unit (PSU) configured to store electrical energy, a wireless energy transfer (WET) unit coupled to the PSU and configured to wirelessly provide electrical energy to one or more of the plurality of vehicles positioned near the charge vehicle, and a controller coupled to the wireless communication module, the PSU, and the WET unit.

The controller may be configured to receive a request to recharge from the one or more of the plurality of vehicles, instruct the one or more of the plurality of vehicles to position in an order relative to the charge vehicle to receive the electrical energy wirelessly, and instruct the WET unit to transfer the electrical energy from the PSU to the one or more of the plurality of vehicles positioned relative to the charge vehicle.

According to some examples, in order to instruct the one or more of the plurality of vehicles to position in the order relative to the charge vehicle, the controller may be configured to instruct the one or more of the plurality of vehicles to approach the charge vehicle in an order according to remaining charge levels of the one or more of the plurality of vehicles, a distance between the charge vehicle and the one or more of the plurality of vehicles, or a time of request to recharge received from each vehicle. The charge vehicle includes a truck and the plurality of vehicles include one or more of a car, a truck, a bus, or a van.

According to other examples, the controller may be further configured to determine a suggested path for the one or more of the plurality of vehicles to approach the charge vehicle based on one or more of remaining charge levels of the one or more of the plurality of vehicles, present locations of the one or more of the plurality of vehicles, a present location of the charge vehicle, a direction of the charge vehicle, directions of the one or more of the plurality of vehicles, a speed of the charge vehicle, speeds of the one or more of the plurality of vehicles and one or more obstacles between the charge vehicle and the one or more of the plurality of vehicles, and control the wireless communication module to transmit the suggested path to the one or more of the plurality of vehicles.

Various embodiments may be implemented in hardware, software, or combination of both hardware and software (or other computer-readable instructions stored on a non-transitory computer-readable storage medium and executable by one or more processors); the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. Also, the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A distributed system to provide wireless energy sharing within a vehicle convoy, the system comprising:
   a charge vehicle communicatively coupled to a plurality of vehicles in the vehicle convoy, wherein the charge vehicle is configured to provide electrical energy to at least one vehicle of the plurality of vehicles, and wherein the plurality of vehicles are configured to be powered by the electrical energy and are configured to recharge wirelessly while moving; and
   the at least one vehicle from the plurality of vehicles, which is configured to:
     determine a situation for the at least one vehicle to receive a recharge;
     determine that the charge vehicle is capable to provide the recharge;
     position the at least one vehicle near the charge vehicle to wirelessly receive the electrical energy for the recharge,
     wherein to position the at least one vehicle near the charge vehicle, the at least one vehicle is configured to exchange a position in the vehicle convoy with another vehicle in the plurality of vehicles according to remaining charge levels of the at least one vehicle and the another vehicle; and recharge through wireless energy transfer from the charge vehicle.

2. The system of claim 1, wherein the charge vehicle is further configured to instruct two or more vehicles of the plurality of vehicles to approach the charge vehicle in an order according to remaining charge levels of the two or more vehicles or according to a time of a request to recharge received from each vehicle of the two or more vehicles.

3. The system of claim 1, wherein the charge vehicle is configured to provide the electrical energy to two or more vehicles of the plurality of vehicles simultaneously.

4. The system of claim 1 wherein the charge vehicle and the plurality of vehicles include one or more of: a car, a truck, a bus, a van, a boat, a ship, or a robotic vehicle.

5. The system of claim 1, wherein the at least one vehicle is configured to position near the charge vehicle by one of automated self-navigation based on instructions received from the charge vehicle or presentation of instructions to approach the charge vehicle to a driver of the at least one vehicle.

6. The system of claim 1, wherein the charge vehicle is further configured to:
determine a suggested path for the at least one vehicle to approach the charge vehicle based on one or more of the remaining charge level of the at least one vehicle, a present location of the at least one vehicle, a present location of the charge vehicle, a direction of the charge vehicle, a direction of the at least one vehicle, a speed of the charge vehicle, a speed of the at least one vehicle, and one or more obstacles between the charge vehicle and the at least one vehicle; and
transmit the suggested path to the at least one vehicle.

7. The system of claim 1, wherein the at least one vehicle is further configured to:
determine a suggested path for the at least one vehicle to approach the charge vehicle based on one or more of the remaining charge level of the at least one vehicle, a present location of the at least one vehicle, a present location of the charge vehicle, a direction of the charge vehicle, a direction of the at least one vehicle, a speed of the charge vehicle, a speed of the at least one vehicle, and one or more obstacles between the charge vehicle and the at least one vehicle.

8. A system to provide wireless energy sharing between vehicles in a vehicle convoy, the system comprising:
a charge vehicle configured to:
lead the vehicle convoy
store electrical energy; and
wirelessly provide the stored electrical energy to a plurality of other vehicles in the vehicle convoy, wherein the plurality of other vehicles are configured to be powered by the electrical energy and configured to recharge wirelessly while moving; and
a controller communicatively coupled to the charge vehicle and the plurality of other vehicles, wherein the controller is configured to:
determine one or more vehicles among the plurality of other vehicles to receive a recharge;
instruct the one or more vehicles to position in an order relative to the charge vehicle within the vehicle convoy to wirelessly receive the electrical energy for the recharge, wherein the order is determined according to remaining charge levels of the one or more vehicles; and instruct the charge vehicle to recharge the one or more vehicles after the one or more vehicles are positioned near the charge vehicle.

9. The system of claim 8, wherein to instruct the one or more vehicles to position in the order relative to the charge vehicle, the controller is configured to instruct the one or more vehicles to position behind the charge vehicle in an order according to a distance between the charge vehicle and the one or more vehicles, or according to a time of a request to recharge received from each vehicle of the one or more vehicles.

10. The system of claim 8, wherein:
the charge vehicle is configured to simultaneously provide the stored electrical energy to two or more vehicles among the plurality of other vehicles, and
the controller is configured to instruct the two or more vehicles, among the plurality of other vehicles, to approach the charge vehicle at a same time.

11. The system of claim 8, wherein the charge vehicle and the plurality of other vehicles include one or more of: a car, a truck, a bus, a van, a boat, a ship, or a robotic vehicle.

12. The system of claim 11, wherein the charge vehicle and the plurality of other vehicles include robotic vehicles, and wherein the controller is configured to provide one of navigation or instructions for automated self-navigation to the robotic vehicles.

13. The system of claim 8, wherein to instruct the one or more vehicles to position in the order relative to the charge vehicle, the controller is configured to instruct the one or more vehicles to position in an order behind the charge vehicle by one of transmission of automated self-navigation instructions or transmission of instructions to be presented to a driver of the one or more vehicles.

14. The system of claim 13, wherein the controller is further configured to:
determine a suggested path for the one or more vehicles to approach the charge vehicle based on one or more of the remaining charge levels of the one or more vehicles, present locations of the one or more vehicles, a present location of the charge vehicle, to direction of the charge vehicle, directions of the one or more vehicles, a speed of the charge vehicle, speeds of the one or more vehicles, and one or more obstacles between the charge vehicle and the one or more vehicles; and
transmit the suggested path to the one or more vehicles.

15. The system of claim 8, wherein the controller includes a communication module configured to communicate with the charge vehicle and the plurality of other vehicles through one or more of cellular wireless communication, wide area network (WAN) wireless communication, or satellite communication.

16. A method to provide wireless energy sharing between vehicles in a vehicle convoy, the method comprising:
determining one or more vehicles among a plurality of vehicles to receive a recharge, wherein the plurality of vehicles within the vehicle convoy includes a charge vehicle, and wherein the charge vehicle is configured to store and provide electrical energy to the one or more vehicles;
instructing the one or more vehicles to position in an order relative to the charge vehicle to receive the electrical energy wirelessly for the recharge, wherein the order is determined based on remaining charge levels of the one or more vehicles; and
instructing the charge vehicle to recharge the one or more vehicles after the one or more vehicles are positioned near the charge vehicle.

17. The method of claim 16, further comprising:
determining a suggested path for the one or more vehicles to approach the charge vehicle based on one or more of the remaining charge levels of the one or more vehicles, present locations of the one or more vehicles, a present location of the charge vehicle, a direction of the charge vehicle, directions of the one or more vehicles, a speed of the charge vehicle, speeds of the one or more vehicles, and one or more obstacles between the charge vehicle and the one or more vehicles.

18. The method of claim 16, wherein instructing the one or more vehicles to position in the order relative to the charge vehicle comprises:
instructing the one or more vehicles to approach the charge vehicle in the order according to the remaining charge levels of the one or more vehicles, a distance between the charge vehicle and the one or more vehicles, or a time of request to recharge received from each vehicle of the one or more vehicles.

19. The method of claim 16, wherein:
instructing the one or more vehicles to position in the order relative to the charge vehicle comprises instructing the one or more vehicles to approach the charge vehicle at a same time, and
instructing the charge vehicle to recharge the one or more vehicles includes instructing the charge vehicle to provide the electrical energy to two or more vehicles simultaneously.

20. The method of claim 16, wherein instructing the one or more vehicles to position in the order relative to the charge vehicle comprises:
instructing the one or more vehicles to position near the charge vehicle by one of transmission of automated self-navigation instructions or transmission of instructions to be presented to a driver of the one or more vehicles.

21. The method of claim 16, further comprising:
identifying one of the vehicles in the vehicle convoy as having extra charge that can be provided as supplemental electrical energy;
identifying another vehicle of the vehicles in the vehicle convoy as having a charge shortage;
instructing the another vehicle having the charge shortage to position itself near the vehicle having the extra charge to receive the supplemental electrical energy wirelessly for a recharge; and
instructing the vehicle having extra charge to provide the supplemental electrical energy to the vehicle having the charge shortage.

22. A charge vehicle to provide wireless energy sharing to a plurality of vehicles within a vehicle convoy, the charge vehicle comprising:
a wireless communication module configured to communicate with the plurality of vehicles;
a power storage unit (PSU) configured to store electrical energy;
a wireless energy transfer (WET) unit coupled to the PSU and configured to wirelessly provide the electrical energy to one or more vehicles among the plurality of vehicles positioned near the charge vehicle; and
a controller coupled to the wireless communication module, the PSU, and the WET unit, the controller configured to:
receive, via the wireless communication module, a request to recharge from the one or more vehicles;
instruct, via the wireless communication module, the one or more vehicles to position in an order relative to the charge vehicle to receive the electrical energy wirelessly, wherein the order is determined according to remaining charge levels of the one or more vehicles; and
instruct the WET unit to transfer the electrical energy from the PSU to the one or more vehicles positioned relative to the charge vehicle.

23. The charge vehicle of claim 22, wherein to instruct the one or more vehicles to position in the order relative to the charge vehicle, the controller is configured to instruct the one or more vehicles to approach the charge vehicle in the order according to the remaining charge levels of the one or more vehicles, a distance between the charge vehicle and the one or more vehicles, or a time of a request to recharge received from each vehicle of the one or more vehicles.

24. The charge vehicle of claim 22, wherein the charge vehicle includes a truck and the plurality of vehicles include one or more of: a car, a truck, a bus, or a van.

25. The charge vehicle of claim 22, wherein the controller is further configured to:
determine a suggested path for the one or more vehicles to approach the charge vehicle based on one or more of the remaining charge levels of the one or more vehicles, present locations of the one or more vehicles, a present location of the charge vehicle, a direction of the charge vehicle, directions of the one or more vehicles, a speed of the charge vehicle, speeds of the one or more vehicles, and one or more obstacles between the charge vehicle and the one or more vehicles; and
control the wireless communication module to transmit the suggested path to the one or more vehicles.

* * * * *

UNITED STATES PATENT AND TRADEMARK OFFICE
CERTIFICATE OF CORRECTION

PATENT NO. : 9,744,870 B2
APPLICATION NO. : 14/538615
DATED : August 29, 2017
INVENTOR(S) : Cronie Page 1 of 1

It is certified that error appears in the above-identified patent and that said Letters Patent is hereby corrected as shown below:

In the Specification

In Columns 3-4, Lines 67-1, delete "may for example" and insert -- may, for example, --, therefor.

In the Claims

In Column 23, Line 15, in Claim 4, delete "claim 1" and insert -- claim 1, --, therefor.

In Column 23, Line 50, in Claim 8, delete "convoy" and insert -- convoy; --, therefor.

In Column 24, Line 40, in Claim 14, delete "to direction of" and insert -- a direction of --, therefor.

Signed and Sealed this
Eighth Day of May, 2018

Andrei Iancu
*Director of the United States Patent and Trademark Office*